(12) United States Patent
Qiu et al.

(10) Patent No.: US 12,398,817 B2
(45) Date of Patent: Aug. 26, 2025

(54) HYDRAULIC CONTROL VALVE, HYDRAULIC CONTROL SYSTEM, AND TRANSMISSION

(71) Applicant: Wuxi InfiMotion Technology Co., Ltd., Wuxi (CN)

(72) Inventors: Zhiling Qiu, Zhejiang (CN); Wenjiang Zhao, Zhejiang (CN); Lingling Fu, Zhejiang (CN); Yanjun Tan, Zhejiang (CN); Xiaozhe Lin, Zhejiang (CN); Ruiping Wang, Zhejiang (CN); Ingo Scholten, Zhejiang (CN)

(73) Assignee: WUXI INFIMOTION TECHNOLOGY CO., LTD., Jiangsu (CN)

( * ) Notice: Subject to any disclaimer, the term of this patent is extended or adjusted under 35 U.S.C. 154(b) by 76 days.

(21) Appl. No.: 18/340,858

(22) Filed: Jun. 24, 2023

(65) Prior Publication Data

US 2023/0349399 A1    Nov. 2, 2023

Related U.S. Application Data

(63) Continuation of application No. PCT/CN2021/093988, filed on May 16, 2021.

(51) Int. Cl.
*F16K 17/04* (2006.01)
*F16H 61/02* (2006.01)
(Continued)

(52) U.S. Cl.
CPC ....... *F16K 17/046* (2013.01); *F16H 61/0267* (2013.01); *F16H 61/0276* (2013.01);
(Continued)

(58) Field of Classification Search
CPC .. F16K 17/046; F16K 17/0466; F16K 17/065; F16H 61/0267; F16H 61/0276;
(Continued)

(56) References Cited

U.S. PATENT DOCUMENTS 3,918,470 A     11/1975   Jacobells
4,955,283 A *   9/1990    Hidaka .................. F15B 13/015
                                                                91/461
(Continued)

FOREIGN PATENT DOCUMENTS

CN       102062204 A     5/2011
CN       102536964 A     7/2012
(Continued)

OTHER PUBLICATIONS

Communication pursuant to Article 94(3) EPC dated Jul. 19, 2024 received in corresponding patent family application No. EP21940045.4.

(Continued)

*Primary Examiner* — Dustin T Nguyen

(57) ABSTRACT

Provided are a hydraulic control valve, a hydraulic control system, and a transmission. The hydraulic control valve includes a valve body, a slidable valve cartridge, and a pressing mechanism. A valve hole, a first oil supply port, a second oil supply port, and an oil discharge port are formed at the valve body, and each of the first oil supply port, the second oil supply port, and the oil discharge port is in communication with the valve hole. Both the slidable valve cartridge and the pressing mechanism are accommodated within the valve hole. The slidable valve cartridge has a small end close to an end of the valve hole and a large end abutting against the pressing mechanism. The pressing mechanism is disposed at another end of the valve hole.

19 Claims, 6 Drawing Sheets

(51) Int. Cl.
*F16H 61/12* (2010.01)
*F16K 17/06* (2006.01)
*B60K 1/00* (2006.01)
*F16H 1/28* (2006.01)
*F16H 48/08* (2006.01)

(52) U.S. Cl.
CPC ......... *F16H 61/12* (2013.01); *F16K 17/0466* (2013.01); *F16K 17/065* (2013.01); *B60K 2001/001* (2013.01); *B60Y 2400/406* (2013.01); *B60Y 2400/42* (2013.01); *B60Y 2400/424* (2013.01); *F16H 1/28* (2013.01); *F16H 48/08* (2013.01); *F16H 2061/1252* (2013.01); *F16H 2200/2007* (2013.01); *F16H 2200/2035* (2013.01)

(58) Field of Classification Search
CPC ............ F16H 61/12; F16H 2061/1252; F16H 2200/2007; F16H 2200/2035; F16H 1/28; F16H 48/08; B60K 2001/001; B60Y 2400/406; B60Y 2400/42; B60Y 2400/424
See application file for complete search history.

(56) References Cited

U.S. PATENT DOCUMENTS 6,170,508 B1 * 1/2001 Faust .................. G05D 7/0126 137/12
9,303,697 B2 * 4/2016 Ren ...................... F16H 61/688

FOREIGN PATENT DOCUMENTS

| | | |
|---|---|---|
| CN | 104500463 A | 4/2015 |
| CN | 105042066 A | 11/2015 |
| CN | 105201950 A | 12/2015 |
| CN | 108691838 A | 10/2018 |
| CN | 109268332 A | 1/2019 |
| DE | 102012007108 A1 | 10/2013 |
| DE | 102014226623 A1 | 6/2016 |
| EP | 2797766 B1 | 10/2016 |
| JP | H01133503 U | 9/1989 |
| JP | H0676608 U | 10/1994 |
| JP | 2000081913 A | 3/2000 |
| JP | 2011208652 A | 10/2011 |
| JP | 2015503711 A | 2/2015 |
| WO | 2019098103 A1 | 5/2019 |

OTHER PUBLICATIONS

First Office Action dated Sep. 27, 2024 received in corresponding patent family application No. JP2023-552042. English translation attached.

Extended European Search Report from corresponding European Application No. EP21940045.4, dated Mar. 6, 2024.

International Search Report dated Feb. 11, 2022 in International Application No. PCT/CN2021/093988. English translation attached.

First Office Action dated Jun. 30, 2025 received in corresponding patent family application No. CN202180072444.4. English translation attached.

* cited by examiner

HYDRAULIC CONTROL VALVE, HYDRAULIC CONTROL SYSTEM, AND TRANSMISSION

CROSS-REFERENCE TO RELATED APPLICATION

This application is a continuation of International Application No. PCT/CN2021/093988 filed on May 16, 2021, the entire content of which is incorporated herein by reference.

FIELD

The present disclosure relates to the field of vehicle technologies, and more particularly, to a hydraulic control valve, a hydraulic control system, and a transmission.

BACKGROUND

In the related art, an automatic transmission of a vehicle uses a friction plate type brake or a clutch to shift gear. Generally, these brakes or clutches are engaged or disengaged for torque control by means of a hydraulic oil pump, an oil cylinder, and a proportional pressure solenoid valve. Although these components are highly reliable, some parts would malfunction in a severe use environment. Some faults may cause a vehicle safety accident and thus must be avoid. For example, for a dual-clutch transmission, when two clutches are simultaneously engaged, the transmission can be self-locked, which causes the vehicle to be out of control in direction and even turn over.

In order to avoid such safety accidents, a pressure sensor and a series solenoid valve are generally added to a control oil circuit of the clutch. Upon it is detected that two oil circuits are at a higher pressure simultaneously, a controller of the transmission can relieve the pressures of one or both of two oil circuits by means of the solenoid valve, thereby avoiding simultaneous engagement of the two clutches. By loading the pressure sensor and the series solenoid valve, it is possible to avoid the safety accidents due to the self-locking of the transmission. However, such pressure sensor and series solenoid valve have high cost and large occupied space. As a result, the transmission has a higher total cost. Currently, these anti-self-locking technologies haven't been applied to most of domestic transmissions yet, which restricts a security level of the transmission.

Therefore, it is necessary to made modification to the related art to replace these pressure sensors and series solenoid valves, thereby reducing the cost of the transmission.

SUMMARY

The present disclosure aims to solve at least one of the technical problems in the related art. To this end, one embodiment of the present disclosure provides a hydraulic control valve including a valve body, a slidable valve cartridge, and a pressing mechanism. A valve hole, a first oil supply port, a second oil supply port, and an oil discharge port are formed at the valve body. Each of the first oil supply port, the second oil supply port, and the oil discharge port is in communication with the valve hole. Both the slidable valve cartridge and the pressing mechanism are accommodated within the valve hole. The slidable valve cartridge has a small end close to an end of the valve hole and a large end abutting against the pressing mechanism. The pressing mechanism is disposed at another end of the valve hole. The slidable valve cartridge is configured to move towards the pressing mechanism to bring the first oil port into communication with the oil discharge port via the valve hole when a total oil supply pressure on the slidable valve cartridge from the first oil supply port and the second oil supply port is greater than a pressing force from the pressing mechanism. The hydraulic control valve has a first operation state and a second operation state. In the first operation state, the total oil supply pressure on the slidable valve cartridge from the first oil supply port and the second oil supply port is small than or equal to the pressing force from the pressing mechanism, and the first oil supply port, the second oil supply port, and the oil discharge port are in no communication with each other. In the second operation state, the total oil supply pressure on the slidable valve cartridge from the first oil supply port and the second oil supply port is greater than the pressing force from the pressing mechanism, and the slidable valve cartridge moves towards the pressing mechanism to bring the first oil supply port into communication with the oil discharge port via the valve hole.

Further, the valve body further includes a valve port formed at the valve hole between the first oil supply port and the oil discharge port. The slidable valve cartridge further includes a sealing portion configured to close or open the valve port through a movement of the slidable valve cartridge to change a communication state between the first oil supply port and the oil discharge port. A shape of the sealing portion matching with a shape of the valve port.

Further, the sealing portion is of a frustum shape having a small end close to the small end of the slidable valve cartridge and a large end close to the large end of the slidable valve cartridge.

Further, a third oil supply port is further formed at the valve body and is in communication with the valve hole. When the valve port is in a closed state, the third oil supply port is in communication with the first oil supply port, and the first oil supply port and the oil discharge port are in no communication with each other. When the valve port is in an open state, the first oil supply port is in communication with the oil discharge port, and the third oil supply port is blocked by the slidable valve cartridge.

Further, the slidable valve cartridge further includes a first pressure sensing end and a second pressure sensing end. The first pressure sensing end is configured to sense an oil supply pressure from the first oil supply port. The first pressure sensing end is an annular surface between the small end of the slidable valve cartridge and the large end of the slidable valve cartridge. The second pressure sensing end is configured to sense an oil supply pressure from the second oil supply port. The second pressure sensing end is a small end surface of the slidable valve cartridge.

Further, a damping orifice is further formed at the slidable valve cartridge. The damping orifice is configured to guide the oil supply pressure from the first oil supply port to the first pressure sensing end, and the damping orifice is in communication with the valve hole.

Further, the pressing mechanism includes a spring and a spring seat. An end of the spring abuts against the large end of the slidable valve cartridge. The spring seat is disposed at the other end of the valve hole and connected to another end of the spring.

Further, the pressing mechanism further includes a spring sleeve coaxially arranged with the slidable valve cartridge and sleeved over the slidable valve cartridge. The end of the spring is connected to the spring sleeve, and the spring is at least partially wrapped by the spring sleeve.

One embodiment of the present disclosure provides a hydraulic control system including a first oil cylinder, a second oil cylinder, a first proportional valve, a second proportional valve, and the hydraulic control valve as described in any one of the above embodiments. An outlet of the first proportional valve is in communication with each of the first oil cylinder and the first oil supply port. An outlet of the second proportional valve is in communication with each of the second oil cylinder and a second oil supply port.

Further, the hydraulic control valve further includes a third oil supply port in communication with the outlet of the first proportional valve.

One embodiment of the present disclosure provides a transmission including the hydraulic control system as described in any one of the above embodiments.

The implementation of the present disclosure has the following beneficial effects.

In the hydraulic control valve, the hydraulic control system and the transmission according to the embodiments of the present disclosure, the hydraulic pressures of two oil supply circuits can be sensed simultaneously. When the total hydraulic pressure from the two oil supply circuits is greater than a predetermined value, the hydraulic control valve can bring one of the two oil supply circuits into communication with the oil discharge port automatically to relieve the pressure of this oil supply circuit. As a result, it is possible to prevent the transmission from being self-locked. Therefore, the hydraulic control valve has a reliable design, fast response, simple structure, and small volume. In addition, there is no need for the hydraulic control valve to be additionally provided with a pressure sensor and series electromagnetic valve. Thus, the hydraulic control valve can be easily manufactured at low cost, thereby solving the problems of high cost and large space occupation in the transmission anti-self-locking technology in the related art.

Additional aspects and advantages of the embodiments of present disclosure will be provided at least in part in the following description, or will become apparent in part from the following description, or can be learned from the practice of the embodiments of the present disclosure.

BRIEF DESCRIPTION OF THE DRAWINGS

In order to clearly explain technical solutions of embodiments of the present disclosure, drawings used in the embodiments are briefly described below. It should be understood that the drawings as described below merely illustrate some embodiments of the present disclosure, and should not be construed as limiting the scope. Based on these drawings, other drawings can be obtained by those skilled in the art without creative effort.

FIG. 1 (*b*) is a structural view of a parallel-type anti-self-locking hydraulic control valve in a second operation state according to an embodiment of the present disclosure.

FIG. 4 (*b*) is a structural view of the hydraulic control valve in FIG. 4 (*a*) during normal operation of the hydraulic control valve.

FIG. 4 (*c*) is a structural view of the hydraulic control valve in FIG. 4 (*a*) during a fault of a control system.

Figure 1:
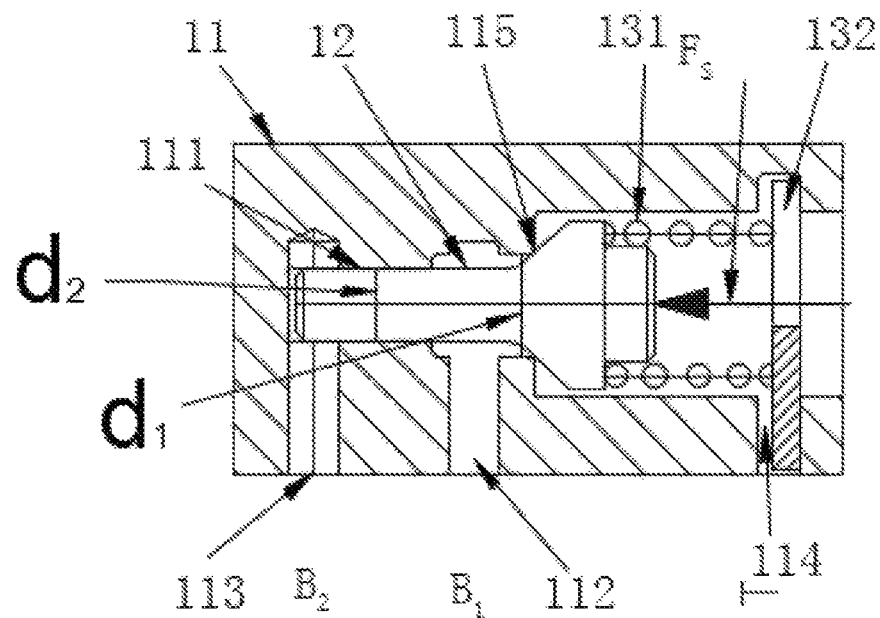
FIG. 1 (*a*) is a structural view of a parallel-type anti-self-locking hydraulic control valve in a first operation state according to an embodiment of the present disclosure.
Figure 1:
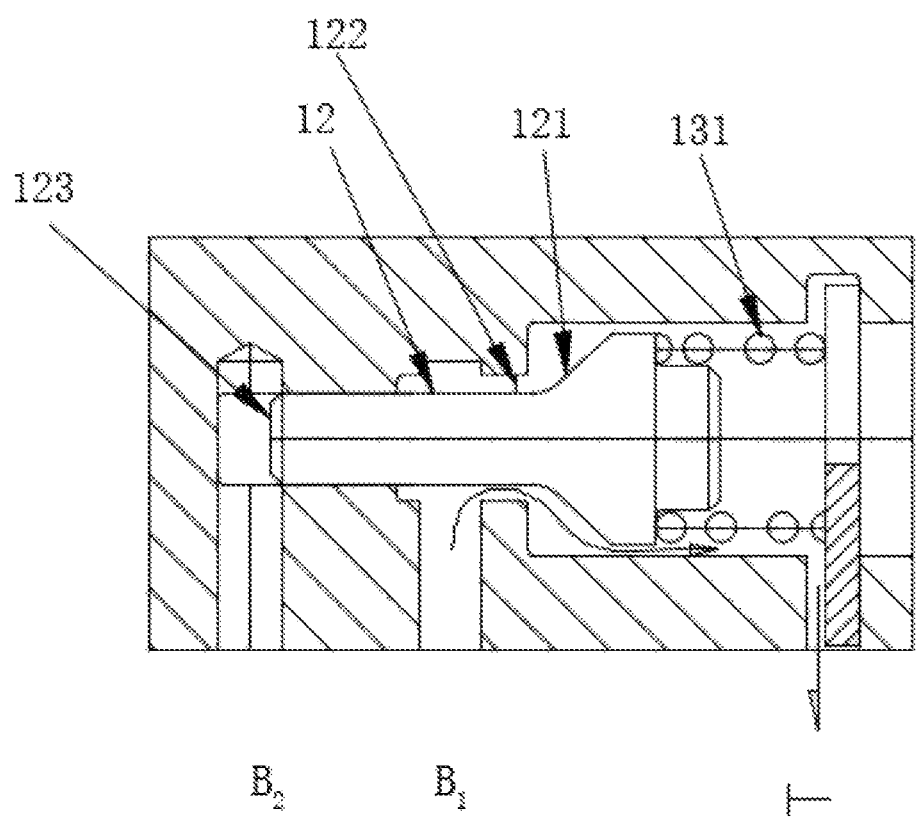

1—hydraulic control valve, 11—valve body, 111—valve hole, 112—first oil supply port, 113—second oil supply port, 114—oil discharge port, 115—valve port, 116—third oil supply port, 12—slidable valve cartridge, 121—sealing portion, 122—first pressure sensing end, 123—second pressure sensing end, 124—damping orifice, 131—spring, 132—spring seat, 133—spring sleeve;

2—first oil cylinder;
3—second oil cylinder;
4—first proportional valve, 41—outlet of first proportional valve;
5—second proportional valve;
6—prime mover;
71—first planetary gear mechanism, 711—first sun gear, 712—first planetary carrier, 713—first output gear, 72—second planetary gear mechanism, 721—second sun gear, 722—second planetary carrier;
8—output shaft, 81—gear, 82—gear;
9—differential gear, 91—gear, 92—tire;
$B_1$—brake; $B_2$—another brake.

DETAILED DESCRIPTION

In order to make the above objects, the technical solutions and advantages of the present disclosure clearer, reference will be made clearly and completely technical solutions in the embodiments of the present disclosure with accompanying drawings. Obviously, the embodiments described here are only part of the embodiments of the present disclosure and are not all embodiments of the present disclosure. Based on the embodiments of the present disclosure, other embodiments obtained by those skilled in the art without creative labor are within scope of the present disclosure. The embodiments of the present disclosure will be described in detail below with reference to examples thereof as illustrated in the accompanying drawings, throughout which same or similar elements, or elements having same or similar functions, are denoted by same or similar reference numerals.

Embodiments of the present disclosure provides an anti-self-locking hydraulic control valve, which can simultaneously sense hydraulic pressures of two hydraulic control oil circuits in communication with brakes or clutches. When a resultant force exerted on the hydraulic control valve from the hydraulic pressures of the two oil circuits is smaller than a threshold, pressure oil can smoothly flow through the two oil circuits to allow for a normal engagement operation of the brakes or the clutches. Once the resultant force exerted on the hydraulic control valve from the hydraulic pressures of the two oil circuits is greater than the threshold, the hydraulic control valve allows the pressure oil of one of the brakes or clutches to bypass through the oil discharge port 114, thereby avoiding further increase of the pressure of the brake. Therefore, it is possible to prevent the two brakes from being locked due to the simultaneous engagement during a control failure.

FIG. 1 (a) is a structural view of a parallel-type anti-self-locking hydraulic control valve in a first operation state according to an embodiment of the present disclosure, in which a position of a slidable valve cartridge 12 during a normal operation of a transmission is shown. FIG. 1 (b) is a structural view of a parallel-type anti-self-locking hydraulic control valve in a second operation state according to an embodiment of the present disclosure, in which a position of the slidable valve cartridge 12 of the anti-self-locking hydraulic control valve during control system failure. Referring to FIG. 1 (a) and FIG. 1 (b), embodiments of the present disclosure provide a hydraulic control valve 1. The hydraulic control valve 1 includes a valve body 11, a slidable valve cartridge 12, and a pressing mechanism.

A valve hole 111, a first oil supply port 112, a second oil supply port 113, and an oil discharge port 114 are formed at the valve body 11. Each of the first oil supply port 112, the second oil supply port 113, and the oil discharge port 114 is in communication with the valve hole 111. The first oil supply port 112 is connected to an oil supply circuit of a brake $B_1$. The second oil supply port 113 is connected to an oil supply circuit of another brake $B_2$. The oil discharge port 114 directly leads to an oil sump.

The hydraulic control valve has a first operation state and a second operation state. In the first operation state, a total oil supply pressure on the slidable valve cartridge from the first oil supply port and the second oil supply port is small than or equal to a pressing force from the pressing mechanism, and the first oil supply port, the second oil supply port, and the oil discharge port are in no communication with each other. In the second operation state, the total oil supply pressure on the slidable valve cartridge from the first oil supply port and the second oil supply port is greater than the pressing force from the pressing mechanism, and the slidable valve cartridge moves towards the pressing mechanism to bring the first oil supply port into communication with the oil discharge port via the valve hole.

It should be noted that, in addition to the first oil supply port 112, the second oil supply port 113, and the oil discharge port 114 as described above, the valve body 11 may further include other oil supply ports and/or oil discharge ports 114.

It should be noted that the first operation state refers to a state in which an oil supply device in communication with the first oil supply port 112 and an oil supply device in communication with the second oil supply port 113 are both in normal operation (no failure) states when supplying oil to their respective oil supply ports. The oil supply device may be a brake and/or a clutch. For example, as illustrated in FIG. 1 (a) and FIG. 1 (b), when the brake $B_1$ in communication with the first oil supply port 112 and the brake $B_2$ in communication with the second oil supply port 113 are both in states in which both the in the related art brake $B_1$ and the brake $B_2$ normally supply oil to their respective oil supply ports, the hydraulic control valve is in a normal operation state (no failure).

The second operation state refers to a state in which when the oil supply device in communication with the first oil supply port 112 and the oil supply device in communication with the second oil supply port 113 supply oil to their respective oil supply ports, one of oil supply circuits in communication with the brake $B_1$ or the brake $B_2$ has an excessive pressure due to the failure and the total hydraulic force on the slidable valve cartridge 12 is greater than the pressing force. In this state, the slidable valve cartridge 12 can bring the first oil supply port 112 into communication with the second oil supply port 113 by a hydraulic force to relieve the oil supply pressure of the oil discharge port 114, thereby preventing the transmission from being locked. For example, when the brake $B_1$ illustrated in FIG. 1 (a) and FIG. 1 (b) in communication with the first oil supply port 112 and the brake $B_1$ cannot perform normal pressure relief due to failure, and the brake $B_2$ illustrated in FIG. 1 (a) and FIG. 1 (b) in communication with the second oil supply port 113 normally supplies oil to its corresponding oil supply port, the hydraulic control valve is in the second operation state.

The slidable valve cartridge 12 and the pressing mechanism are both accommodated in the valve hole 111. A small end of the slidable valve cartridge 12 is located close to one end of the valve hole 111, and a large end of the slidable valve cartridge 12 abuts against the pressing mechanism. The pressing mechanism is disposed at the other end of the valve hole 111.

When the total oil supply pressure on the slidable valve cartridge 12 from the first oil supply port 112 and the second oil supply port 113 is greater than the pressing force from the pressing mechanism, the slidable valve cartridge 12 can move towards the pressing mechanism to bring the first oil supply port 112 into communication with the oil discharge port 114 via the valve hole 111. The pressing force is a total maximum hydraulic pressure simultaneously exerted on the slidable valve cartridge 12 by the first oil supply port 112 and the second oil supply port 113 during the normal operation.

When one of oil supply circuits in communication with the brake $B_1$ or the brake $B_2$ is at excessive pressure due to the failure, and the total hydraulic force on the slidable valve cartridge 12 is greater than the pressing force, the slidable valve cartridge 12 can bring the first oil supply port 112 into communication with the oil discharge port 114 with the hydraulic force, to relieve the oil supply pressure of the first oil supply port 112, thereby preventing the transmission from being locked.

In some embodiments, the valve hole 111 is a stepped valve hole 111. A valve port 115 is formed at the valve hole 111 between the first oil supply port 112 and the oil discharge port 114.

The slidable valve cartridge 12 is a stepped slidable valve cartridge 12. The slidable valve cartridge 12 further includes a sealing portion 121. The sealing portion 121 is configured to close or open the valve port 115 through a movement of the slidable valve cartridge 12 to change a communication state between the first oil supply port 112 and the oil discharge port 114. A shape of the sealing portion 121 matches with a shape of the valve port 115. For example, as illustrated in FIG. 1(a) and FIG. 1(b), the sealing portion 121 may be of a frustum shape having a small end close to the small end of the slidable valve cartridge 12 and a large end close to the large end of the slidable valve cartridge 12.

In the normal operation state, a diameter $d_1$ of the valve hole 111 at a position corresponding to the small end of the slidable valve cartridge 12 is greater than a diameter $d_2$ of the valve hole 111 at a position corresponding to the large end of the slidable valve cartridge 12.

The slidable valve cartridge 12 further includes a first pressure sensing end 122 and a second pressure sensing end 123. The first pressure sensing end 122 is configured to sense an oil supply pressure from the first oil supply port 112. In an example, the first pressure sensing end 122 is an annular surface between the small end (a circular area with a diameter $d_2$) of the slidable valve cartridge 12 and the large end (a circular area with a diameter $d_1$) of the slidable valve cartridge 12. An annular area between the small end and the large end of the slidable valve cartridge 12 satisfies:

$$A_1(=\pi(d_1^2-d_2^2)/4).$$

The second pressure sensing end 123 is configured to sense an oil supply pressure from the second oil supply port 113. In an example, the second pressure sensing end 123 is a small end surface (a circular area with a diameter $d_2$) of the slidable valve cartridge 12. The small end area of the slidable valve cartridge 12 satisfies:

$$A_2(=\pi d_2^2/4).$$

According to the above embodiments, the pressing force of the pressing mechanism is set as the total maximum hydraulic pressure on the slidable valve cartridge 12 during the simultaneous oil supplying to the two brakes. Assuming that a maximum operation pressure of the brake $B_1$ is $B_{1max}$, and a maximum operation pressure of the brake $B_2$ is $B_{2max}$, the pressing force satisfies:

$$F_S=A_2B_{2max}+c_1A_1B_{1max},$$

where $c_1$ is a self-locking pressure coefficient of the brake, and the brake is locked or burnt out when the pressure of the brake $B_1$ is greater than $c_1B_{1max}$. Generally, $c_1$ is about 0.5. For example, $c_1$ may range within any one of [0.3, 0.7], [0.35, 0.65], [0.4, 0.6], and [0.48, 0.52]. It should be noted that the value range of $c_1$ may also be set as desired, and the present disclosure is not limited thereto.

When a vehicle normally travels, only one of the brake $B_1$ and the brake $B_2$ is supplied with oil to operate, the hydraulic force exerted on the slidable valve cartridge 12 is thus smaller than the pressing force $F_s$, and the slidable valve cartridge 12 is pressed at the valve port 115 by the pressing mechanism. In this case, the valve port 115 is blocked by the sealing portion 121 of the slidable valve cartridge 12, and the first oil supply port 112, the second oil supply port 113 and the oil discharge port 114 are in no communication with each other. As a result, the anti-locking valve has no effect on the oil supply to the two brakes.

Figure 2:
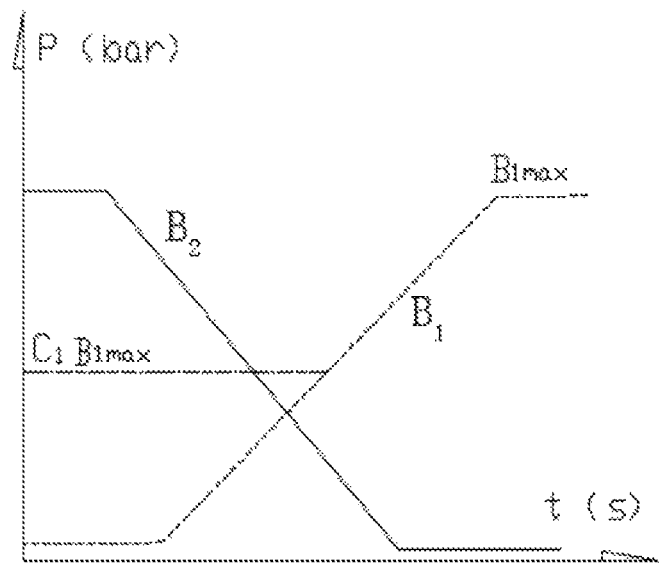
FIG. 2 is a pressure change graph of a transmission engaged with and disengaged from a clutch oil cylinder during normal gear shift of the transmission according to embodiments of the present disclosure.

FIG. 2 is a pressure change graph of a transmission engaged with and disengaged from a clutch oil cylinder during normal gear shift of the transmission according to embodiments of the present disclosure. During the gear shift of the vehicle, the pressures of the two brakes are interchanged, as illustrated in FIG. 2. In order to avoid power interruption, the pressure of the brake $B_1$ during its engagement starts to increase slowly before the pressure of the brake $B_2$ during its disengagement completely removed.

However, when the pressure of the brake $B_1$ reaches $c_1B_{1max}$, the pressure of the brake $B_2$ decreases below $c_1B_{1max}$, the hydraulic pressure on the slidable valve cartridge 12 from the oil supply pressures of the two brake is still far smaller than the pressing force $F_s$, and the slidable valve cartridge 12 is still pressed at the valve port 115 by the pressing mechanism. In this case, the first oil supply port 112, the second oil supply port 113, and the oil discharge port 114 are in no communication with each other. As a result, the hydraulic control valve has no effect on the normal oil supply to the two brakes.

Figure 3:
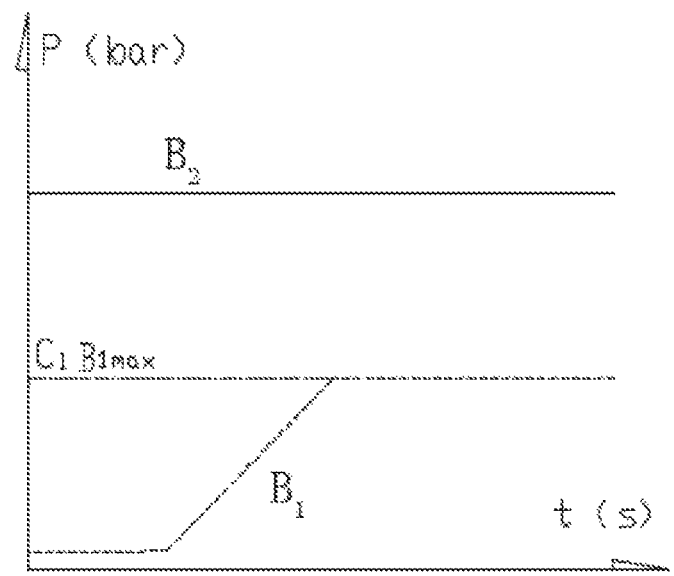
FIG. 3 is a pressure change graph of a two-clutch oil cylinder during a gear shift fault according to embodiments of the present disclosure.

FIG. 3 is a pressure change graph of a two-clutch oil cylinder during a gear shift failure according to embodiments of the present disclosure. Referring to FIG. 3, in a case where one of the two oil circuits (for example, the oil supply circuit in communication with the brake $B_2$) cannot relieve the pressure due to failure, when the pressure of the other one of the two circuits (for example, the oil supply circuit in communication with the brake $B_1$) increases to be greater than the predetermined value $c_1B_{1max}$ during the gear shift, the hydraulic force on the slidable valve cartridge 12 is greater than the pressing force $F_s$. In this case, the slidable valve cartridge 12 moves away from the valve port 115 with hydraulic force to bring the first oil supply port 112 into communication with the oil discharge port 114. Therefore, the oil supply pressure of the brake $B_1$ is relieved to prevent the transmission from being locked.

In some embodiments, the pressing mechanism includes a spring 131 and a spring seat 132. An end of the spring 131 abuts against the large end of the slidable valve cartridge 12. The other end of the spring 131 is connected to the spring seat 132. The spring seat 132 is disposed at the other end of the valve hole 111.

In some embodiments, the pressing mechanism further includes a spring sleeve 133. The spring sleeve 133 is coaxially arranged with the slidable valve cartridge 12 and sleeved over the slidable valve cartridge 12. The end of the spring 131 is connected to the spring sleeve 133. The spring 131 is at least partially wrapped by the spring sleeve 133.

Figure 4:
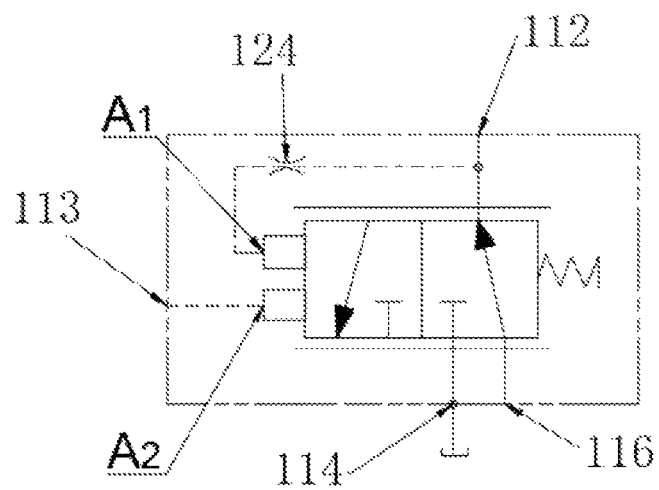
FIG. 4 (*a*) is schematic view of a series-type self-locking hydraulic control valve according to another embodiment of the present disclosure.
Figure 4:
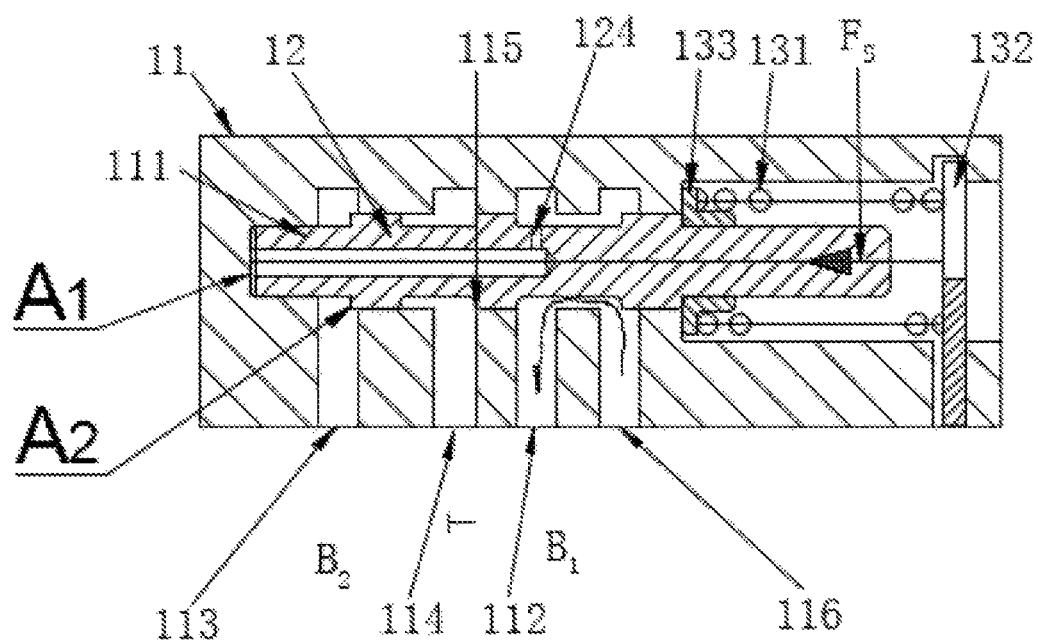
Figure 4:
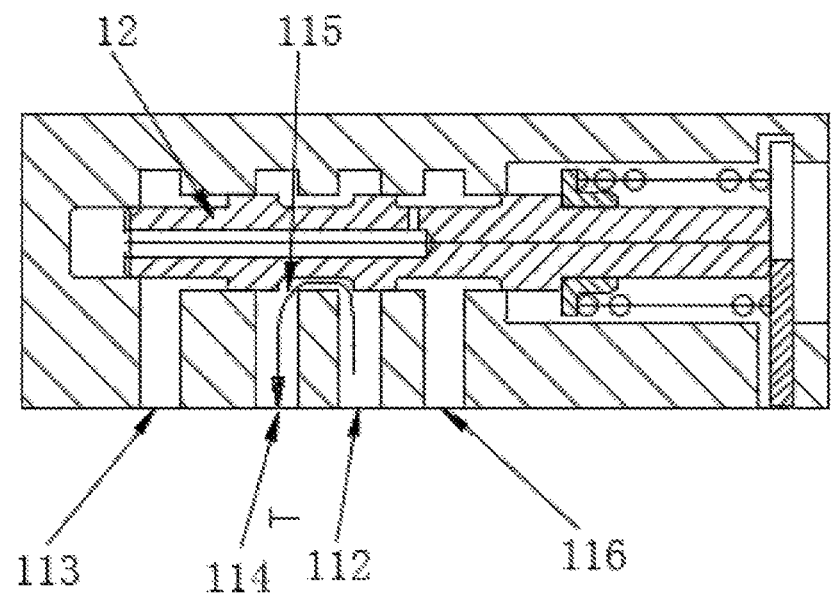

FIG. 4 (a) is schematic view of a series-type self-locking hydraulic control valve according to another embodiment of the present disclosure. FIG. 4 (b) is a structural view of the hydraulic control valve in FIG. 4 (a) during the normal operation of the hydraulic control valve, in which a position of the slidable valve cartridge 12 during the normal operation of the transmission is shown. FIG. 4 (c) is a structural view of the hydraulic control valve in FIG. 4 (a) during control system failure, in which a position of the slidable valve cartridge 12 during the control system failure is shown. When the brake $B_1$ is at a lower operation pressure and a space is enough, the anti-locking valve may also be designed into the series form as illustrated in FIG. 4 (a), FIG. 4 (b), and FIG. 4 (c). In one embodiment, the hydraulic control valve includes a valve body 11, a slidable valve cartridge 12, and a pressing mechanism.

As shown in FIG. 4 (b), a valve hole 111, a first oil supply port 112, a second oil supply port 113, a third oil supply port 116, and an oil discharge port 114 are formed at the valve body 11, and each of the first oil supply port 112, the second oil supply port 113, the third oil supply port 116, and the oil discharge port 114 are in communication with the valve hole 111. The slidable valve cartridge 12 and the pressing mechanism are both accommodated in the valve hole 111. The slidable valve cartridge 12 has an end close to an end of the valve hole 111 and a part that has a greater diameter than the end close to the end of the valve hole and abuts against the pressing mechanism. The pressing mechanism is disposed at the other end of the valve hole 111.

When a total oil supply pressure on the slidable valve cartridge 12 from the first oil supply port 112 and the second oil supply port 113 is greater than a pressing force from the pressing mechanism, the slidable valve cartridge 12 moves towards the pressing mechanism to bring the first oil supply port 112 into communication with the oil discharge port 114 via the valve hole 111. In this case, the third oil supply port 116 is blocked by the slidable valve cartridge 12.

When the pressing force from the pressing mechanism is set as a total maximum hydraulic force exerted on the slidable valve cartridge 12 by both the first oil supply port 112 and the second oil supply port 113 during a normal operation (i.e., the hydraulic control valve is in a first operation state). During the normal operation, a hydraulic force on the slidable valve cartridge 12 from a total oil supply pressure of the two clutches is smaller than a force $F_S$ of the spring 131, and the slidable valve cartridge 12 is pressed at a left position illustrated in FIG. 4 (*b*). In this case, the valve port 115 is closed. In addition, the first oil supply port 112, the second oil supply port 113, and the oil discharge port 114 are in no communication with each other, and the first oil supply port 112 is in communication with the third oil supply port 116 to deliver oil from the third oil supply port 116 to the first oil supply port 112.

When the two oil circuits each are at high pressure due to the failure, the hydraulic force on the slidable valve cartridge 12 is greater than the force $F_S$ of the spring 131, and the slidable valve cartridge 12 moves rightwards into a position illustrated in FIG. 4 (*c*) with the hydraulic force. In this case, the valve port 115 is opened, and the first oil supply port 112 is in communication with the oil discharge port 114. Therefore, the pressure oil from the first oil supply port 112 is discharged through the oil discharge port 114 to prevent the transmission from being locked. Meanwhile, the third oil supply port 116 is also blocked by the slidable valve cartridge 12 to prevent pressure oil of the entire hydraulic system from being leaked. Thus, it is possible to ensure that the vehicle can limp home without gear shift by means of the other brake $B_2$ that is not pressure-relieved. Although the series-type anti-self-locking hydraulic control valve according to the embodiments of the present disclosure is complex and prone to leakage, oil supply can be cut off when failure occurs, thereby ensuring that the vehicle can travel home smoothly.

In some embodiments, the valve port 115 is formed at the valve hole 111 between the first oil supply port 112 and the oil discharge port 114. The sealing portion 121 of the slidable valve cartridge 12 is configured to close or open the valve port 115 through the movement of the slidable valve cartridge 12 to change a communication state between the first oil supply port 112 and the oil discharge port 114. A shape of the sealing portion 121 matches with a shape of the valve port 115.

In some embodiments, the slidable valve cartridge 12 includes a first pressure sensing end 122 and a second pressure sensing end 123. The description of the first pressure sensing end 122 and the second pressure sensing end 123 may refer to the above embodiments, and details thereof will be omitted herein.

In some embodiments, a damping orifice 124 is further formed at the slidable valve cartridge 12. The damping orifice 124 is configured to guide an oil supply pressure from the first oil supply port 112 to the first pressure sensing end 122. The damping orifice 124 is in communication with the valve hole 111.

In some embodiments, the pressing mechanism includes a spring 131 and a spring seat 132. An end of the spring 131 abuts against the large end of the slidable valve cartridge 12, and the other end of the valve hole 111 is connected to the spring seat 132. The spring seat 132 is disposed at the other end of the valve hole 111. In addition, in order to facilitate the design of the spring 131, the pressing mechanism further includes a spring sleeve 133. The spring sleeve 133 is coaxially arranged with the slidable valve cartridge 12 and sleeved on the slidable valve cartridge 12. The end of the spring 131 is connected to the spring sleeve 133. The spring 131 is at least partially wrapped by the spring sleeve 133.

Figure 5:
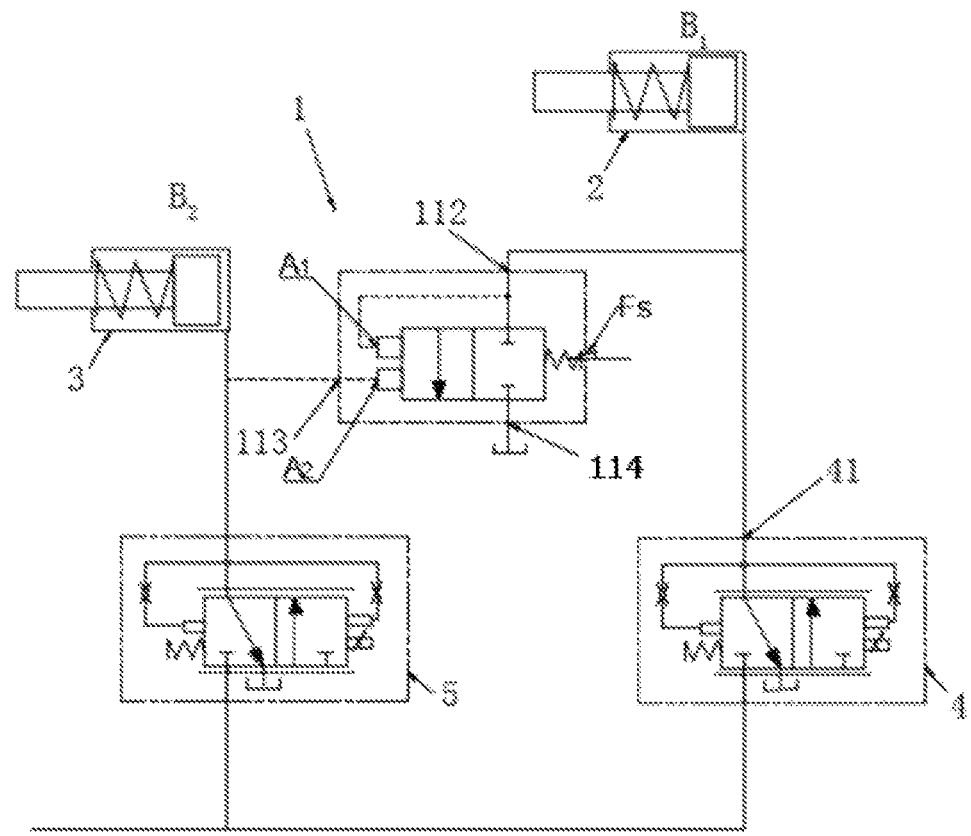
FIG. 5 is a schematic view of an anti-self-locking hydraulic control system according to an embodiment of the present disclosure.

FIG. 5 is a schematic diagram of an anti-self-locking hydraulic control system according to an embodiment of the present disclosure. With reference to FIG. 5, in the hydraulic control system according to the present disclosure, a self-locking hydraulic control valve 1 is connected in parallel or in series to a hydraulic oil supply circuit of a brake or clutch that may be self-locked due to misoperation. The hydraulic control system includes a first oil cylinder 2, a second oil cylinder 3, a first proportional valve 4, a second proportional valve 5, and the hydraulic control valve 1 according to the above embodiments of the present disclosure.

An outlet 41 of the first proportional valve is in communication with the first oil cylinder 2 and the first oil supply port 112. An outlet of the second proportional valve 5 is in communication with the second oil cylinder 3 and the second oil supply port 113.

It should be noted that, in the first operation state, the oil supply device in communication with the first oil supply port 112 and the oil supply device in communication with the second oil supply port 113 are both in the normal operation (no failure) states when supplying oil to their respective oil supply ports. The oil supply device may be a brake and/or a clutch.

The first oil cylinder 2 and the second oil cylinder 3 are control oil cylinders of the two brakes of the transmission, and are supplied with oil by a first electromagnetic proportional valve and a second electromagnetic proportional valve, respectively. When the first electromagnetic proportional valve and the second electromagnetic proportional valve supply high-pressure oil to the two oil cylinders simultaneously due to the failure, the two brakes are engaged simultaneously. As a result, the transmission and wheels of the vehicle are locked, which results in accidents. According to this embodiment, the brake control system as illustrated in FIG. 1 is additionally provided with the anti-self-locking hydraulic control valve 1. The hydraulic control valve 1 can sense oil supply pressures of the first oil cylinder 2 and of the second oil cylinder 3 simultaneously without influence on the oil supplying to the brake $B_1$ and the brake $B_2$. When the total hydraulic pressure on the slidable valve cartridge 12 from the first oil cylinder 2 and the second oil cylinder 3 is higher than a predetermined pressure (i.e., the pressing force of the pressing mechanism) of the spring 131 of the hydraulic control valve 1, the valve port 115 of the hydraulic control valve 1 is opened to discharge the pressure oil of the first oil cylinder 2 through the oil discharge port 114, thereby avoiding the simultaneous operations of the two brakes and the locking of the transmission.

When the brake $B_1$ is at a low operation pressure and the space is enough, the series-type self-locking hydraulic control valve 1 illustrated in FIG. 4 (*a*), FIG. 4 (*b*), and FIG. 4 (*c*) is further connected in series to the hydraulic oil supply circuit of the brake or the clutch that is self-locked due to the misoperation. The series-type self-locking hydraulic control valve 1 further includes a third oil supply port 116 in communication with the outlet 41 of the first proportional valve.

During the normal operation, the first oil supply port 112, the second oil supply port 113, and the oil discharge port 114 are in no communication with each other, and the first oil supply port 112 is in communication with the third oil supply port 116 to deliver the oil from the third oil supply port 116 to the first oil supply port 112.

When the two oil circuits each are at high pressure due to the failure, the hydraulic pressure exerted on the slidable valve cartridge 12 is greater than the force $F_s$ of the spring 131. In this case, the valve port 115 is opened, and the first oil supply port 112 is in communication with the oil discharge port 114 to discharge the pressure oil from the first oil supply port 112 through the oil discharge port 114. Thus, it is possible to prevent the transmission from being locked. Meanwhile, the third oil supply port 116 is also blocked by the slidable valve cartridge 12 to prevent the pressure oil of the entire hydraulic system from being leaked. Thus, it is possible to ensure that the vehicle can limp home without gear shift by means of the other brake $B_2$ that is not pressure-relieved.

Embodiments of the present disclosure provide a transmission. The transmission includes the hydraulic control system as described in the above embodiments. The transmission may be a transmission having a plurality of brakes or clutches.

Figure 6:
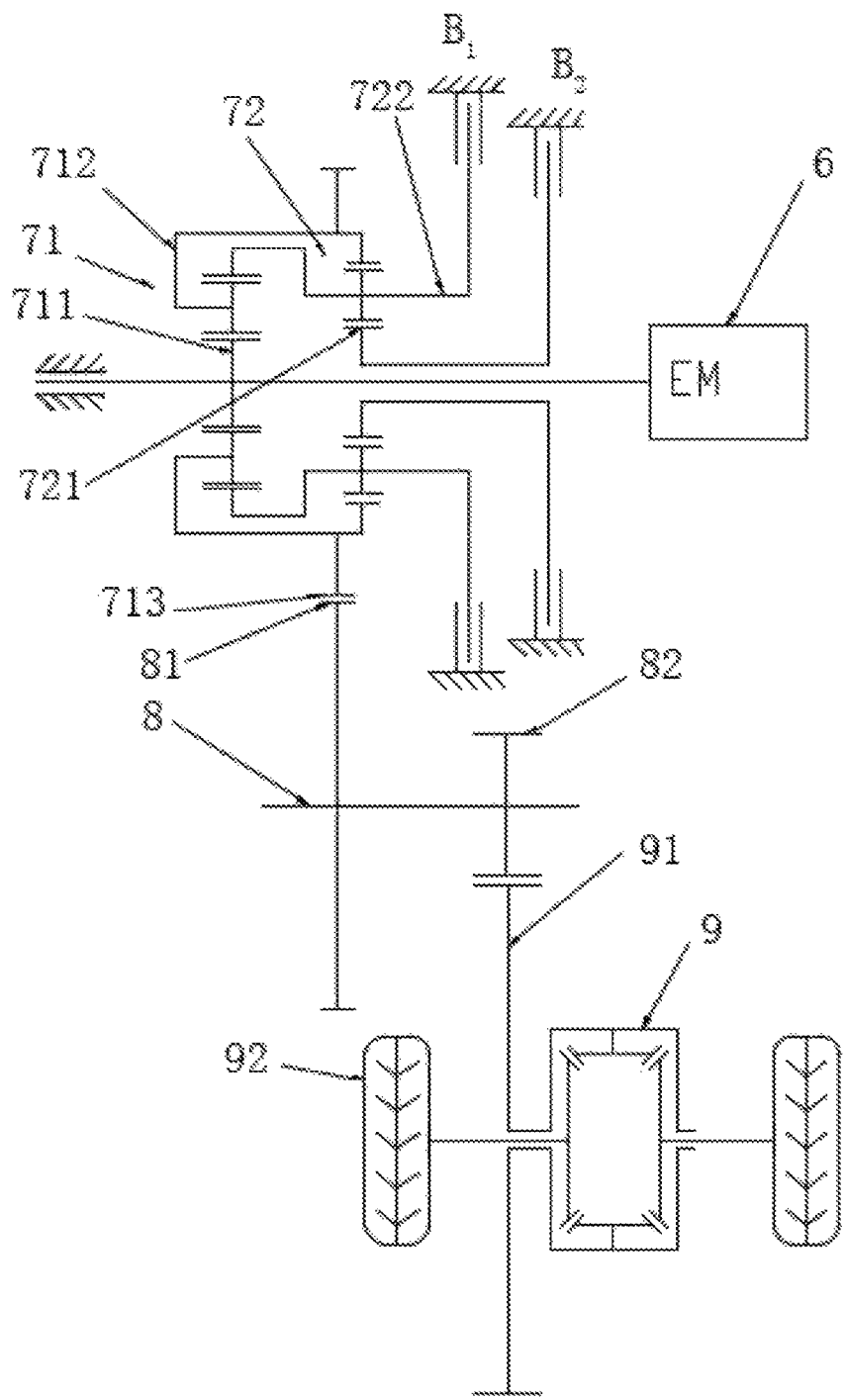
FIG. 6 is a schematic view of a dual-speed transmission according to an embodiment of the present disclosure.

FIG. 6 is a schematic view of a dual-speed transmission according to an embodiment of the present disclosure. With reference to FIG. 6, the transmission mainly includes a brake $B_1$, a brake $B_2$, a first planetary gear mechanism 71, a second planetary gear mechanism 72, an output shaft 8, and a differential gear 9. A prime mover 6 is directly connected to a first sun gear 711 of the first planetary gear mechanism 71, and a first planetary carrier 712 of the first planetary gear mechanism 71 is connected to a first output gear 713. When the brake $B_1$ is engaged, tires 92 are driven by the prime mover 6 through the first sun gear 711, the first planetary carrier 712, a gear pair 713/81, and a gear pair 82/91. In this way, a first gear speed ratio up to 10 or more can be provided. When the brake $B_1$ is disengaged, and the brake $B_2$ is engaged, the tires 92 are driven by the prime mover 6 through the first sun gear 711, the first planetary carrier 712, the second planetary carrier 722, the gear pair 713/81, and the gear pair 82/91. In this way, a second gear speed ratio of about 5 can be provided.

In the related art, when the two brakes $B_1$ and $B_2$ are simultaneously supplied with the pressure oil due to the failure, the transmission may be self-locked. Sudden self-locking of the transmission on a highway or a wet slippery road may result in locking of the wheels and out-of-controlling of the vehicle in direction, even rollover of the vehicle. However, in the present disclosure, the anti-locking valve can automatically restrict the oil supply pressure during the failure, thereby effectively avoiding locking of the wheels, which in turn avoiding rollover accident.

Figure 7:
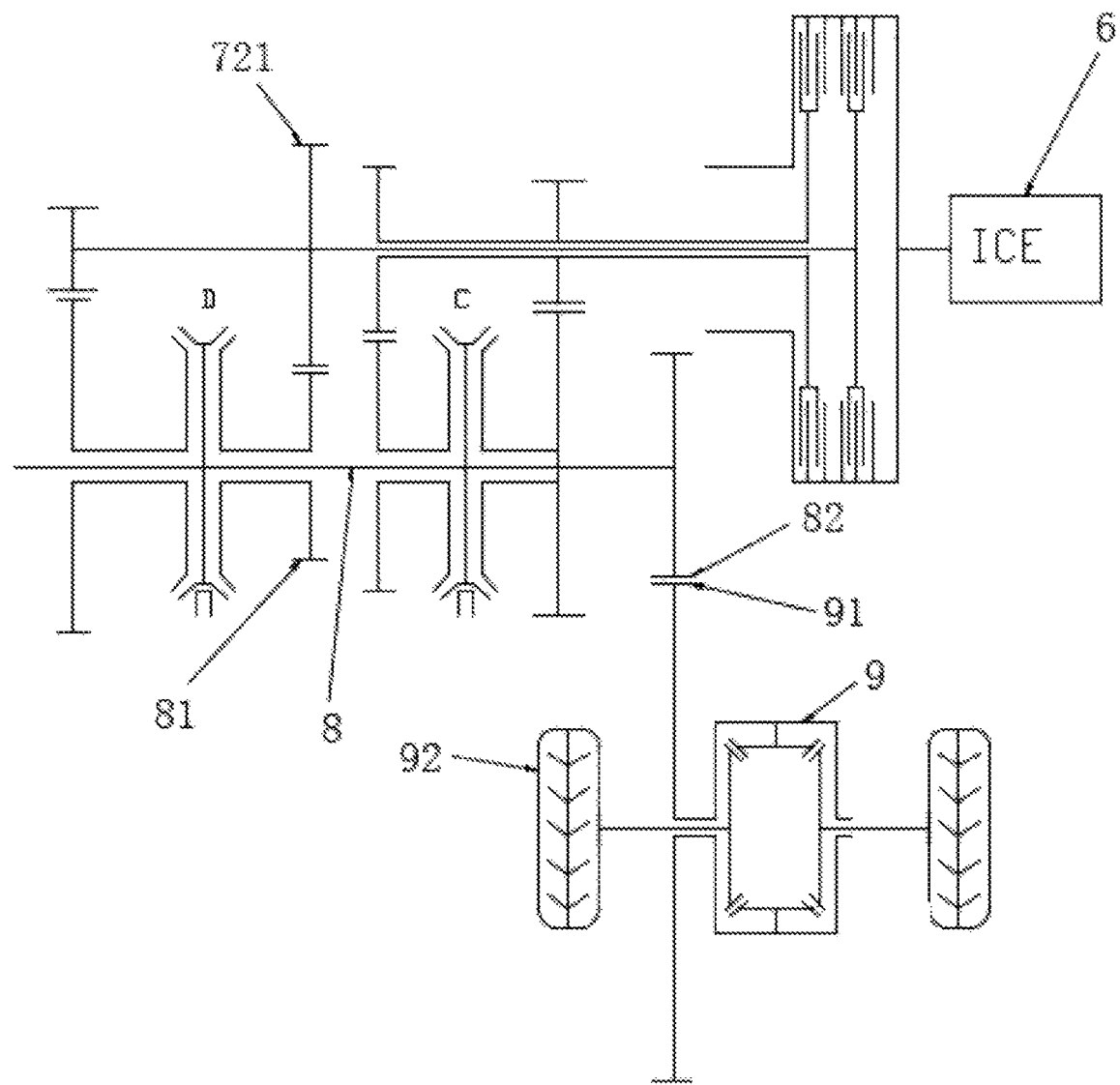
FIG. 7 is a schematic view of a dual-clutch multi-speed transmission according to another embodiment of the present disclosure.

FIG. 7 is a schematic diagram of a dual-clutch multi-speed transmission according to another embodiment of the present disclosure. Referring to FIG. 7, the embodiments of the present disclosure may also be applied to the dual-clutch multi-speed transmission illustrated in FIG. 7. The anti-locking valve is connected to the oil supply circuits of a clutch $B_1$ and a clutch $B_2$ to avoiding simultaneous operations of the two clutches, thereby avoiding the wheel locking accident.

Compared with the existing anti-self-locking of the transmission in the related art, in the embodiments of the present disclosure, one electromagnetic valve, two pressure sensors, and corresponding electronic failure safety software are replaced with one anti-locking valve. In this way, cost and space of these parts can be saved, and reliability of the transmission is further enhanced because these removed parts are not absolutely reliable.

It should be noted that the embodiments of the present disclosure are not limited to avoiding the self-locking of the transmission, and can also be applied in any hydraulic system that needs to avoid simultaneous operations of two hydraulic brakes.

According to the hydraulic control valve, the hydraulic control system, and the transmission according to the embodiments of the present disclosure, the hydraulic pressures of the two oil supply circuits can be sensed simultaneously. When the total hydraulic pressure from the two oil supply circuits is greater than a predetermined value, the hydraulic control valve can bring one of the two oil supply circuits into communication with the oil discharge port 114 automatically to relieve the pressure of this oil supply circuit. As a result, it is possible to prevent the transmission from being self-locked.

The hydraulic control valve has a reliable design, fast response, simple structure, and small volume. In addition, there is no need for the hydraulic control valve to be additionally provided with a pressure sensor and series electromagnetic valve. Thus, the hydraulic control valve can be easily manufactured at low cost, thereby solving the problems of high cost and large space occupation in the transmission anti-self-locking technology in the related art.

It should be noted that the sequence of the embodiments of the present disclosure is merely for description, and does not represent the advantages and disadvantages of the embodiments. The specific embodiments of the present specification are described above. Other embodiments fall within the scope of the appended claims. Each embodiment in the specification is described in a progressive manner. The same or similar parts of various embodiments can be referred to each other. Each embodiment focuses on differences from other embodiments.

While the preferred embodiments of the present disclosure have been described above, they are not intended to limit the present disclosure. Any modifications, equivalent substitutions, and improvements made within the spirit and principle of the present disclosure should fall within the scope of the present disclosure.

What is claimed is:

1. A hydraulic control valve, comprising a valve body, a slidable valve cartridge, and a pressing mechanism, wherein:
    a valve hole, a first oil supply port, a second oil supply port, and an oil discharge port are formed at the valve body, each of the first oil supply port, the second oil supply port, and the oil discharge port being in communication with the valve hole;
    both the slidable valve cartridge and the pressing mechanism are accommodated within the valve hole;
    the slidable valve cartridge has an end close to an end of the valve hole and a part that has a greater diameter than the end close to the end of the valve hole and abuts against the pressing mechanism;
    the pressing mechanism is disposed at another end of the valve hole; and
    the hydraulic control valve has a first operation state and a second operation state, wherein:
    the oil discharge port directly leads to an oil sump;
    wherein the slidable valve cartridge further comprises:
        a first pressure sensing end configured to sense an oil supply pressure from the first oil supply port, the first pressure sensing end being an annular surface between the end of the slidable valve cartridge and the part of the slidable valve cartridge; and
        a second pressure sensing end configured to sense an oil supply pressure from the second oil supply port, the second pressure sensing end being a small end surface of the slidable valve cartridge; and
    in the first operation state, a force on the slidable valve cartridge resulting from a total oil supply pressure on the slidable valve cartridge from the first oil supply port and the second oil supply port is smaller than or equal to a pressing force from the pressing mechanism, and the first oil supply port, the second oil supply port, and the oil discharge port are not in communication with each other; and
    in the second operation state, the force on the slidable valve cartridge resulting from the total oil supply pressure on the slidable valve cartridge from the first oil supply port and the second oil supply port is greater than the pressing force from the pressing mechanism, and the slidable valve cartridge moves towards the pressing mechanism to bring the first oil supply port into communication with the oil discharge port via the valve hole.

2. The hydraulic control valve according to claim 1, wherein:
the valve body further comprises a valve port formed at the valve hole between the first oil supply port and the oil discharge port; and
the slidable valve cartridge further comprises a sealing portion configured to close or open the valve port through a movement of the slidable valve cartridge to change a communication state between the first oil supply port and the oil discharge port, a shape of the sealing portion matching with a shape of the valve port.

3. The hydraulic control valve according to claim 2, wherein the sealing portion is of a frustum shape having a small end close to the end of the slidable valve cartridge and a large end close to the part of the slidable valve cartridge.

4. The hydraulic control valve according to claim 2, wherein:
a third oil supply port is further formed at the valve body and is in communication with the valve hole;
when the valve port is in a closed state, the third oil supply port is in communication with the first oil supply port, and the first oil supply port and the oil discharge port are not in communication with each other; and
when the valve port is in an open state, the first oil supply port is in communication with the oil discharge port, and the third oil supply port is blocked by the slidable valve cartridge.

5. The hydraulic control valve according to claim 1, wherein a damping orifice is further formed at the slidable valve cartridge, the damping orifice being configured to guide the oil supply pressure from the first oil supply port to the first pressure sensing end, and the damping orifice being in communication with the valve hole.

6. The hydraulic control valve according to claim 1, wherein the pressing mechanism comprises:
a spring, an end of the spring abutting against the part of the slidable valve cartridge; and
a spring seat being disposed at the other end of the valve hole and connected to another end of the spring.

7. The hydraulic control valve according to claim 6, wherein the pressing mechanism further comprises a spring sleeve coaxially arranged with the slidable valve cartridge and sleeved over the slidable valve cartridge, the end of the spring being connected to the spring sleeve, and the spring sleeve being at least partially wrapped by the spring.

8. A hydraulic control system, comprising:
a first oil cylinder;
a second oil cylinder;
a first proportional valve;
a second proportional valve; and
the hydraulic control valve according to claim 1, wherein:
an outlet of the first proportional valve is in communication with each of the first oil cylinder and the first oil supply port; and
an outlet of the second proportional valve is in communication with each of the second oil cylinder and the second oil supply port.

9. The hydraulic control system according to claim 8, wherein:
the valve body further comprises a valve port formed at the valve hole between the first oil supply port and the oil discharge port; and
the slidable valve cartridge further comprises a sealing portion configured to close or open the valve port through a movement of the slidable valve cartridge to change a communication state between the first oil supply port and the oil discharge port, a shape of the sealing portion matching with a shape of the valve port.

10. The hydraulic control system according to claim 9, wherein the sealing portion is of a frustum shape having a small end close to the end of the slidable valve cartridge and a large end close to the part of the slidable valve cartridge.

11. The hydraulic control system according to claim 9, wherein:
a third oil supply port is further formed at the valve body and is in communication with the valve hole;
when the valve port is in a closed state, the third oil supply port is in communication with the first oil supply port, and the first oil supply port and the oil discharge port are not in communication with each other; and
when the valve port is in an open state, the first oil supply port is in communication with the oil discharge port, and the third oil supply port is blocked by the slidable valve cartridge.

12. The hydraulic control system according to claim 8, wherein the slidable valve cartridge further comprises:
a first pressure sensing end configured to sense an oil supply pressure from the first oil supply port, the first pressure sensing end being an annular surface between the end of the slidable valve cartridge and the part of the slidable valve cartridge; and
a second pressure sensing end configured to sense an oil supply pressure from the second oil supply port, the second pressure sensing end being a small end surface of the slidable valve cartridge.

13. The hydraulic control system according to claim 12, wherein a damping orifice is further formed at the slidable valve cartridge, the damping orifice being configured to guide the oil supply pressure from the first oil supply port to the first pressure sensing end, and the damping orifice being in communication with the valve hole.

14. The hydraulic control system according to claim 8, wherein the pressing mechanism comprises:
a spring, an end of the spring abutting against the part of the slidable valve cartridge; and
a spring seat being disposed at the other end of the valve hole and connected to another end of the spring.

15. The hydraulic control system according to claim 14, wherein the pressing mechanism further comprises a spring sleeve coaxially arranged with the slidable valve cartridge and sleeved over the slidable valve cartridge, the end of the spring being connected to the spring sleeve, and the spring sleeve being at least partially wrapped by the spring.

16. The hydraulic control system according to claim 8, wherein the hydraulic control valve further comprises a third oil supply port in communication with the outlet of the first proportional valve.

17. A transmission, comprising the hydraulic control system according to claim 8.

18. The transmission according to claim 17, wherein:
the valve body further comprises a valve port formed at the valve hole between the first oil supply port and the oil discharge port; and the slidable valve cartridge further comprises a sealing portion configured to close or open the valve port through a movement of the slidable valve cartridge to change a communication state between the first oil supply port and the oil discharge port, a shape of the sealing portion matching with a shape of the valve port.

19. The transmission according to claim 17, wherein the hydraulic control valve further comprises a third oil supply port in communication with the outlet of the first proportional valve.

* * * * *